UNITED STATES PATENT OFFICE.

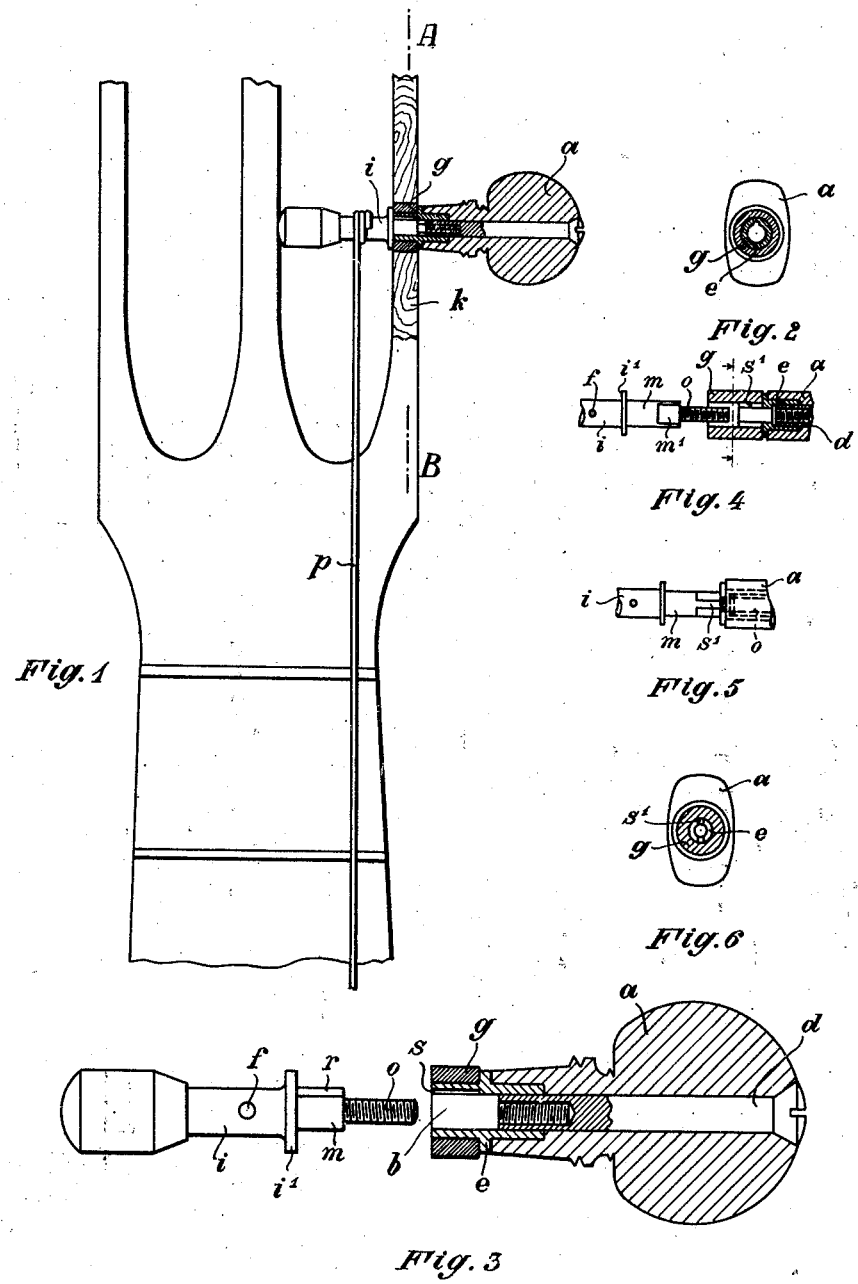

KARL CASPARI, OF FRANKFORT-ON-THE-MAIN-GINNHEIM, GERMANY.

TENSIONING PEG FOR STRINGED INSTRUMENTS.

1,422,738.                     Specification of Letters Patent.        Patented July 11, 1922.

Application filed August 29, 1921. Serial No. 496,750.

*To all whom it may concern:*

Be it known that KARL CASPARI, a citizen of the German Republic, residing at Frankfort-on-the-Main-Ginnheim, Germany, has invented certain new and useful Improvements in Tensioning Pegs for Stringed Instruments, of which the following is a specification.

Devices for securing the tensioning pegs in stringed instruments are already known in which the stem is connected with the head of the peg by a screw extending through the head and having a tubular internally screw threaded end adapted to engage an externally screw threaded extension of the stem, the member serving as a bearing in the peg box and the stem being caused to partake in the rotation of the peg head if the screw in the peg head is tightened so as to grip the bearing member tightly between the stem and the peg head.

In accordance with the present invention a rigid but easily detachable form of connection of the stem with the peg is formed by a cylindrical hollow extension on the head of the peg serving as a support for the bearing member in the peg box and a groove or the like in the extension with which a feather or a flat on the stem may engage so that the extension simultaneously serves as a good support and affords a rigid connection with the stem.

The invention is illustrated by way of example in the accompanying drawing in which:

Fig. 1 shows one arrangement illustrating the peg on the neck of a guitar in longitudinal section, Fig. 2 is a section on the line A—B of Fig. 1, Fig. 3 shows the peg on an enlarged scale and partly in longitudinal section, Fig. 4 is a view corresponding to Fig. 3, Fig. 5 shows the peg with the parts jointed, Fig. 6 is a view corresponding to Fig. 2 of a second embodiment.

As shown, a recess $b$ in the head of the peg $a$ which contains a pin $d$ is formed with an internal screw thread. In a recess at the end of the peg head fits tightly a cylindrical bush $e$ which rotates with the head $a$. The bush $e$ fits friction tight in the sleeve $g$ fitted in the box $k$, the friction being normally sufficient to prevent the peg from turning backwards. The stem $i$ is formed with a pin $m$ fitting in the opening $b$ and a threaded extension $o$ adapted to engage the internal thread in the pin $d$. On the pin $m$ is fitted a feather $r$ which may enter a groove $s$ in the bush $e$. In the stem $i$ is provided the usual hole $f$ for fastening the string or the like $p$.

After the string $p$ is attached, the stem $i$, $m$, $o$ is inserted in the opening $b$ in the head of the peg $a$ with the bush $e$ inserted in the sleeve $g$, so that the groove $s$ engages the feather $r$. Then the screw $d$ is screwed in the head $a$ until it brings the stem with its collar $i^1$ against the sleeve $g$.

Instead of the engagement of the pin $m$ and the opening $b$ by means of a feather $r$ and groove $s$ the stem $m^1$ may as shown in Figs. 4, 5 and 6 be flattened and the bush $e$ formed with a corresponding slot $s^1$.

In this manner the head and stem are firmly connected together yet they can be rotated together in the sleeve $g$ or in the wall $k$ of the box so as to permit tensioning the string $p$ and prevent the peg from turning backwards.

I claim:—

1. An improved tensioning peg for stringed instruments comprising in combination an externally screw threaded stem, and a peg, a head on said peg, an internally threaded pin in said peg head connecting said peg head with said externally threaded stem, a cylindrical projection on said peg head, having a groove in the inner boring, a feather on said stem engaging with said groove, a peg box and a bearing member in said peg box supported by said cylindrical projection.

2. An improved tensioning peg for stringed instruments comprising in combination an externally threaded stem, and a peg, a head on said peg, an internally threaded pin in said peg head connecting said peg head with said externally threaded stem, a cylindrical projection on said peg head having a groove in the inner boring, a flattened part of said stem engaging with said groove, a peg box, and a bearing member in said peg box supported by said cylindrical projection.

In testimony whereof I affix my signature in presence of two witnesses.

KARL CASPARI.

Witnesses:
 BERNARD V. PUIRN,
 KATHARINA FÖLL.